(12) United States Patent
Mayer et al.

(10) Patent No.: US 12,498,477 B2
(45) Date of Patent: Dec. 16, 2025

(54) RADAR SENSOR HEAD FOR A RADAR SYSTEM

(71) Applicant: Robert Bosch GmbH, Stuttgart (DE)

(72) Inventors: Marcel Mayer, Lonsee (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1030 days.

(21) Appl. No.: 17/040,327

(22) PCT Filed: Jan. 31, 2019

(86) PCT No.: PCT/EP2019/052332
§ 371 (c)(1),
(2) Date: Sep. 22, 2020

(87) PCT Pub. No.: WO2019/192762
PCT Pub. Date: Oct. 10, 2019

(65) Prior Publication Data
US 2021/0018616 A1    Jan. 21, 2021

(30) Foreign Application Priority Data

Apr. 5, 2018   (DE) .................. 102018205125.9

(51) Int. Cl.
*G01S 13/931* (2020.01)
*G01S 7/00* (2006.01)
(Continued)

(52) U.S. Cl.
CPC ............ *G01S 13/931* (2013.01); *G01S 7/003* (2013.01); *G01S 7/40* (2013.01); *G01S 13/87* (2013.01);
(Continued)

(58) Field of Classification Search
CPC .......... G01S 13/931; G01S 7/003; G01S 7/40; G01S 13/87; G01S 7/356; G01S 2013/9316; H01Q 1/3233
See application file for complete search history.

(56) References Cited

U.S. PATENT DOCUMENTS 3,435,922 A   4/1969  Schmid
3,734,254 A   5/1973  Yanikoshi
(Continued)

FOREIGN PATENT DOCUMENTS

CN   103946897 A   7/2014
CN   105393292 A   3/2016
(Continued)

OTHER PUBLICATIONS

Schoor, Michael. "Hochauflösende Winkelschätzung für automobile Radarsysteme [high-resolution angle estimation for automobile radar systems]," 2010. University Stuttgart, Stuttgart, Germany.
(Continued)

*Primary Examiner* — Vladimir Magloire
*Assistant Examiner* — Yonghong Li
(74) *Attorney, Agent, or Firm* — NORTON ROSE FULBRIGHT US LLP

(57) ABSTRACT

A radar sensor head for a radar system, including: at least one transmitting antenna for generating, and at least one receiving antenna for receiving, radar waves; an interface for connecting the radar sensor head to a data lead; and an identification unit for identifying the radar sensor head, a downloading of calibration data of the sensor head to a central control apparatus being initiatable by way of the identification unit.

13 Claims, 3 Drawing Sheets

(51) Int. Cl.
*G01S 7/40* (2006.01)
*G01S 13/87* (2006.01)
*H01Q 1/32* (2006.01)
*G01S 7/35* (2006.01)

(52) U.S. Cl.
CPC ............ *H01Q 1/3233* (2013.01); *G01S 7/356* (2021.05); *G01S 2013/9316* (2020.01)

(56) References Cited

U.S. PATENT DOCUMENTS

| | | | |
|---|---|---|---|
| 6,842,713 B1* | 1/2005 | Hutmacher | G01M 99/00 |
| | | | 702/122 |
| 2003/0065445 A1* | 4/2003 | White | G01S 13/951 |
| | | | 702/2 |
| 2003/0117310 A1* | 6/2003 | Kikuchi | G01V 8/005 |
| | | | 342/191 |
| 2010/0277297 A1* | 11/2010 | Eckel | G01S 7/526 |
| | | | 340/435 |
| 2011/0278109 A1 | 11/2011 | No | |
| 2013/0087417 A1 | 4/2013 | Yu et al. | |
| 2013/0270047 A1 | 10/2013 | Kim | |
| 2014/0000993 A1 | 1/2014 | No | |
| 2014/0380037 A1* | 12/2014 | Matsuda | H04L 63/06 |
| | | | 713/150 |
| 2015/0260833 A1* | 9/2015 | Schumann | G01S 15/87 |
| | | | 367/13 |
| 2016/0273602 A1 | 9/2016 | Poertzgen et al. | |
| 2017/0082159 A1 | 3/2017 | Son et al. | |
| 2017/0153314 A1* | 6/2017 | Siemes | G08G 1/161 |
| 2019/0093750 A1 | 3/2019 | Matsuto et al. | |
| 2019/0265703 A1* | 8/2019 | Hicok | G06Q 10/02 |
| 2020/0165856 A1 | 5/2020 | Scheuring et al. | |
| 2020/0189549 A1 | 6/2020 | Mazzarini et al. | |

FOREIGN PATENT DOCUMENTS

| | | | | |
|---|---|---|---|---|
| DE | 102007045561 A1 | 4/2009 | | |
| DE | 102012220311 A1 | 5/2014 | | |
| DE | 102012024880 A1 | 6/2014 | | |
| EP | 2090897 A1 | 8/2009 | | |
| EP | 2090899 A2 * | 8/2009 | ............ | G01S 13/60 |
| EP | 2455779 A1 * | 5/2012 | ............ | G01S 15/003 |
| EP | 3165944 A1 | 5/2017 | | |
| JP | 2005164435 A | 6/2005 | | |
| JP | 2010091490 A | 4/2010 | | |
| JP | 2015019189 A | 1/2015 | | |
| JP | 2016050778 A | 4/2016 | | |
| WO | 2015176884 A1 | 11/2015 | | |
| WO | 2017153964 A1 | 9/2017 | | |

OTHER PUBLICATIONS

International Search Report for PCT/EP2019/052332, Issued Jun. 17, 2019.

Schoor, Michael, et al., "High-resolution angle estimation for an automotive FMCW radar sensor," University Stuttgart, Stuttgart, Germany, 2011, pp. 1-5.

* cited by examiner

RADAR SENSOR HEAD FOR A RADAR SYSTEM

FIELD

The present invention relates to a radar sensor head for a radar system. The present invention further relates to a radar system. The present invention further relates to a method for manufacturing a radar sensor head for a radar system.

BACKGROUND INFORMATION

Radar sensors are increasingly being installed in vehicles that have a high level of driver assistance functions or automated driving functions. The purpose of the greater number of radar sensors is to achieve higher performance for the automated or partly automated functions as compared with single radar sensors. Existing solutions in this sector involve radar sensors that carry out, internally to the sensor, extensive data processing of the radar waves that are received. The radar sensors can thus supply data at an object level or localization level for further evaluation by the vehicle. It is thereby possible to reduce the volume of data transferred to the vehicle, but the respective radar sensors must possess greater computation performance and a larger memory.

It is disadvantageous in this context that computation performance and memory size are relatively unfavorably scalable with respect to increased performance. This results in particular from the fact that based on a defined performance requirement, microcontroller technology is no longer sufficient for the steps required for processing the received radar waves. In order to enhance performance, the necessary calculations and analyses must therefore be carried out internally to the sensor in the context of microprocessor technologies. This can have disadvantageous effects on a price, size, and power dissipation of a radar sensor.

SUMMARY

An object of the present invention is to provide a radar sensor head for a radar system which is economically and flexibly scalable in terms of the number of elements used.

This object may be achieved in accordance with the present invention. Advantageous embodiments of the present invention are described herein.

According to a first aspect of the present invention, the object may be achieved with a radar sensor head for a radar system. IN accordance with an example embodiment of the present invention, the radar sensor head includes:
- at least one transmitting antenna for generating, and at least one receiving antenna for receiving, radar waves;
- an interface for connecting the radar sensor head to a data lead; and
- an identification unit for identifying the radar sensor head, a downloading of calibration data of the sensor head to a central control apparatus being initiatable by way of the identification unit.

With the example radar sensor head, an authentication that is necessary in any case is combined with a download of necessary calibration data to the central control device. The calibration data correspond to the respective radar sensor head and are essential for proper functionality of the radar sensor head. Advantageously, it is thereby possible to reduce memory outlay for the calibration data in the radar sensor head. This advantageously contributes to allowing a sensor head manufacturer to upload the calibration data to the server, and allowing those data then to be downloaded to the central control device when necessary (e.g., on the occasion of a repair facility visit). Simple installation and maintenance of radar sensor heads is thereby supported.

A partitioning of the overall system is therefore enabled by furnishing a radar sensor head.

Present-day radar sensors are often designed as "fast chirp" radars. This means that many fast frequency modulated continuous wave (FMCW) ramps are transmitted in a sampling region; this is also referred to as a "chirp sequence" or a "rapid chirp" method. Once the received radar signals have been mixed, the base band signals are filtered, digitized, and generally delivered to a two-dimensional Fourier transform. Because a subsequent Doppler fast Fourier transform (FFT) cannot take place until the data or measured signals of all the ramps or frequencies have been processed, a large memory is necessary in order to buffer the received radar signals. A need also exists for high computation performance given the stringent latency requirement, for which reason hardware accelerators are usually used.

In consideration of the use of several radar sensors in a vehicle, it is advantageous to concentrate the necessary computation performance in at least one central control device. The respective radar sensors can thus be configured as compact and economical radar sensor heads having no significant power dissipation. The overall result is to achieve a better price/performance ratio and to implement higher performance for the radar system.

In accordance with an example embodiment of the present invention, a radar sensor head has components for generating and transmitting radar waves, and components for receiving and processing received radar waves. The processing of the received radar waves is limited here to a minimal level, or takes place with a minimal outlay. In particular, the measured data of the received radar waves can be digitized by the analog/digital converter and can then be transferred at high bandwidth to the at least one central control device. Further processing of the digitized measured data from the at least one radar sensor head can then occur in the central control device.

Costs for the respective radar sensor heads can thereby be reduced, since less computing performance is required in the radar sensor heads. A lower power dissipation can also occur in the respective radar sensor head due to the smaller number of processing steps. The computation outlay in the at least one central control apparatus does increase, but computation performance can be scaled here more easily and with less outlay as compared with the costs that occur. In the context of an overall consideration of the radar system, the radar system according to the present invention can be expanded and scaled inexpensively and flexibly as compared with previous approaches. In addition, thanks to the greater computing performance of the at least one central control apparatus, more-complex and higher-performance algorithms can be used for processing of the received radar waves.

With increasing high-level integration, it is additionally possible to integrate a first processing step into a high-frequency module, for example a monolithic microwave integrated circuit (MMIC). This can preferably be an analysis unit for carrying out a Fourier analysis. For example, the analysis unit can carry out a range FFT of the digitized measured data. Other Fourier transforms can also be used, depending on the modulation method that is utilized. This first processing step as a rule can be integrated inexpensively into the existing components of a radar sensor head, since the area required in the high-frequency module is very small and there is little memory requirement. The silicon area that is used when manufacturing the corresponding high-frequency module can thus usually remain the same.

A preferred embodiment of the radar sensor head in accordance with the present invention is notable for the fact that it furthermore has a preprocessing unit for defined preprocessing of received data. Greater system integration within the radar sensor head is thereby advantageously furnished.

A further preferred embodiment of the radar sensor in accordance with the present invention is notable for the fact that the calibration data are updatable by way of the identification unit. The result is, for example, to contribute to allowing the radar sensor head to remain in the system, while nevertheless making possible new functionalities that are possible only by way of new calibration data.

A further preferred embodiment of the radar sensor head in accordance with the present invention includes that the downloading of the calibration data is executable in wireless or wire-based fashion. It is thereby possible to carry out the downloading of the calibration data using different technologies, with the result that different circumstances can be take into account (e.g., vehicle at a standstill, vehicle being driven, etc.).

A further preferred embodiment of the radar sensor head in accordance with the present invention is notable for the fact that in conjunction with the downloading of the calibration data, an enabling of the radar sensor head is executable. This contributes to allowing the radar sensor to be used only in authorized fashion, while misuse is thereby largely precluded.

A further preferred embodiment of the radar sensor head in accordance with the present invention is notable for the fact that a sensor ID is transferrable by way of the identification unit. The result is to implement a simple type of identification of the radar sensor head, with which further access protection for the radar sensor head is implemented.

A further preferred embodiment of the radar sensor head in accordance with the present invention is notable for the fact that the sensor ID is transferrable in encrypted or signed fashion by way of the identification unit. The result is to implement a further feature by way of which improved access protection for the radar sensor head is implemented.

A further preferred embodiment of the radar sensor head in accordance with the present invention is notable for the fact that a public key of an encryption method is transferrable as a sensor ID. It is thereby possible to use a suitable encryption method by which a secure identification or authentication of the radar sensor head can be carried out.

A further preferred embodiment of the radar sensor head in accordance with the present invention includes that the calibration data are at least one of the following: typical noise level, antenna properties, amplitude/phase deviations, position of antenna elements, temperature properties, temperature profile. Different properties of the antenna or of the sensor can thereby advantageously be compensated for or adapted during operation of the radar sensor head.

A further preferred embodiment of the radar sensor head in accordance with the present invention includes that the radar waves received by the at least one receiving antenna are convertible by an analog/digital converter into digital measured data, and are labelable with at least one time datum. Received sequences can thereby be accurately allocated in terms of time, which contributes to accurate processing of the measured data.

Preferred exemplifying embodiments of the present invention are explained in further detail below with reference to highly simplified schematic depictions.

BRIEF DESCRIPTION OF THE DRAWINGS

In the Figures, identical design elements respectively have identical reference numbers.

DETAILED DESCRIPTION OF EXAMPLE EMBODIMENTS

Figure 1:
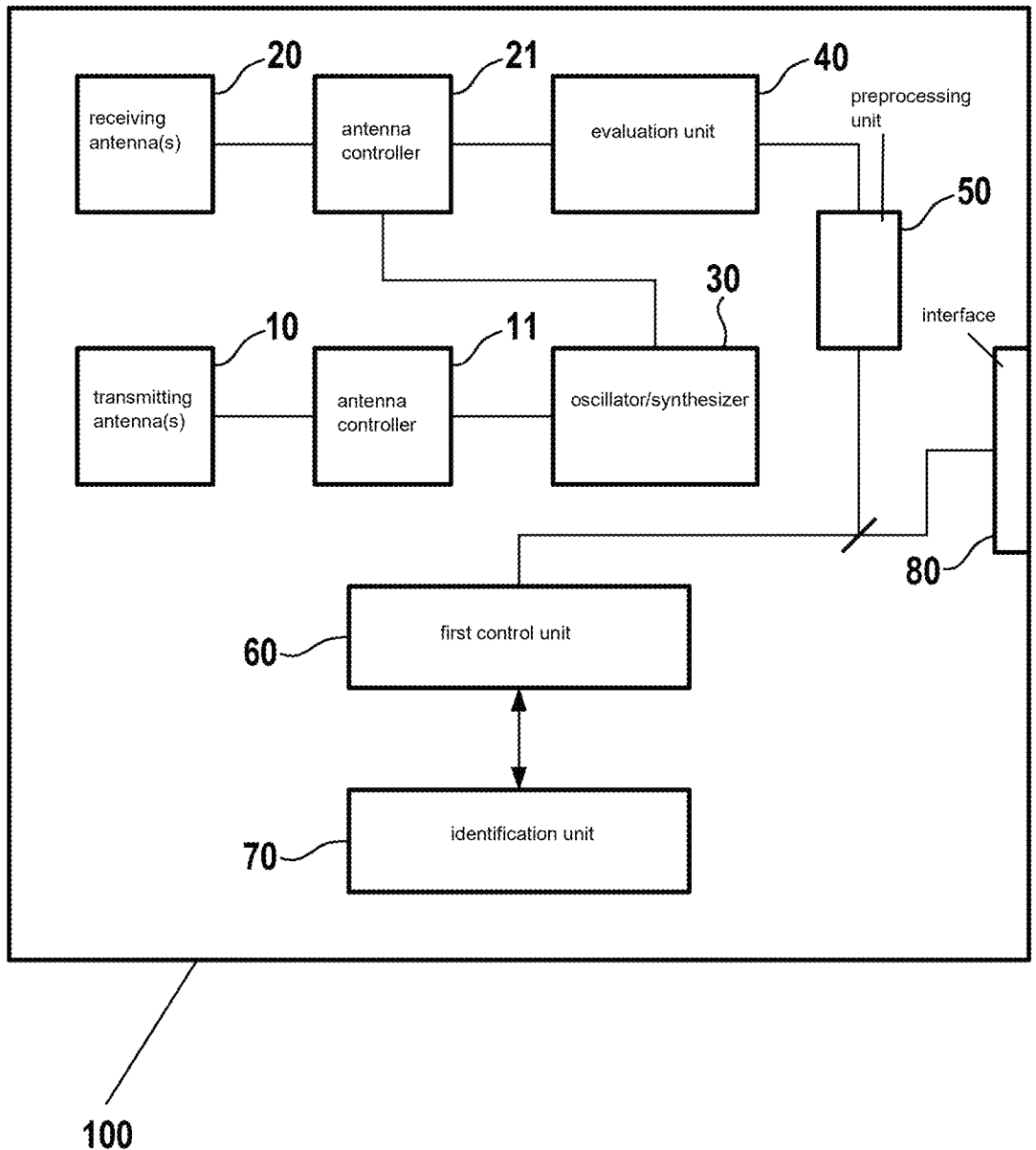
FIG. 1 schematically depicts an example radar sensor head in accordance with the present invention.

FIG. 1 schematically depicts an example radar sensor head 100 in accordance with the present invention. Radar sensor head 100 has at least one transmitting antenna 10 that is operable via an associated antenna controller 11. Antenna controller 11 is coupled, inter alia, to at least one oscillator or synthesizer 30 in order to generate a carrier frequency of the radar waves.

In addition, at least one receiving antenna 20 is connected to an associated antenna controller 21. Antenna controller 21 is functionally connected to an evaluation unit 40, received radar waves being converted, by way of an A/D converter disposed in evaluation unit 40, into digital measured data and then, in a first processing step, transformed by way of a preprocessing unit 50.

The radar waves received from receiving antenna 20 of radar sensor head 100 are convertible by the analog/digital converter of the evaluation unit into digital measured data, and labelable with at least one time datum. The received radar waves or measured data are thereby converted into a digital format and can thus more easily be further processed. Advantageously, the measured data converted into the digital format can be equipped with a time stamp; for instance, each recorded spectrum can receive its own time stamp.

A fast Fourier transform can preferably be carried out with the aid of preprocessing unit 50. The result is that after digitization, the sampled values or received radar waves are not transferred directly but instead are subjected to a first processing process. The fast Fourier transform is preferably a range FFT that can be adapted to the particular intended purpose. The range FFT represents a first dimension of the FFT in which the Doppler effect plays a completely subordinate role, and resulting frequency bins are therefore substantially entirely range-dependent.

Since this transform requires relatively little memory, preprocessing unit 50 can be manufactured, for example, using RFCMOS technology and can be integrated into a MMIC, for example a high-frequency module of radar sensor head 100. Because, as a result of the anti-aliasing filter, not all range bins are required (for example 90% or 45% of the bins), the resulting data volume can be reduced and the FFT can be used simultaneously as a buffer for reducing peak data rates of radar sensor head 100.

Also shown in radar sensor head 100 is an identification unit 70 with which radar sensor head 100 identifies itself with respect to a central control apparatus ("central control device," not depicted). Identification unit 70 is embodied to initiate, with an identification with respect to the central control apparatus, a download of calibration data to the central control apparatus. The advantageous result thereby achieved is that an identification step or authentication step can be concurrently connected to the downloading of calibration data which are appropriate for radar sensor head 100 and are used by the central control apparatus during operation. As a result, it is advantageously not necessary to keep the calibration data on hand in a memory in radar sensor head 100.

The result thereby achieved is that the calibration data do not need to be kept on hand in radar sensor head 100, but instead a retrieval of the calibration data can be centralized from the viewpoint of the central control apparatus. Only the identification unit is therefore kept on hand in radar sensor head 100 in order to identify radar sensor head 100, the calibration data then being fetched by the central control apparatus from the cloud, which is embodied, for instance, as a server of a repair facility, of the vehicle manufacturer, or of the manufacturer of the radar sensor head. The calibration data are kept on hand on the aforesaid sensor, preferably in a database. Access to the server is easily possible via a network access or internet access. The memory in the radar sensor head can thereby advantageously be omitted, making the head less expensive. Advantageously, the aforesaid calibration data can also be updated from time to time, with the result that, for instance, new functionalities for the radar sensor head can be implemented.

In order to achieve further access protection, a sensor ID of radar sensor head 100 can be transferred in encrypted or signed fashion during the identification operation, for instance, by way of identification unit 70. It is also possible to use as a sensor ID a public key of an encryption method that is used, thereby providing an even further improvement in protection from manipulation or misuse.

It is also advantageously possible to perform, in the course of the downloading of the calibration, an enabling of radar sensor head 100 ("component protection"). This makes it possible for radar sensor head 100 to be used only in authorized fashion; in other words, manipulation can be prevented, which represents an important criterion especially for automated vehicles.

The downloaded calibration data can be at least one of the following: typical noise level of the antennas, antenna properties, amplitude deviations or phase deviations of the antennas, position of antenna elements, temperature properties and temperature profiles of the antennas.

The calibration data allow, for instance, antenna properties that are governed by a technological manufacturing process to be adapted or compensated for. As a rule, the calibration data are ascertained, and radar sensor head 100 is calibrated, once during the manufacturing operation, application of the calibration data occurring during operational use of radar sensor head 100. The calibration data allow signals to be processed, or appropriate control to be applied to the antennas of the radar sensor head.

Deviations of the real antenna diagram from an ideal antenna diagram can be described by so-called "global calibration matrices," which describe deviations that result from phase and amplitude errors and from feedback between channels (see also M. Schoor, dissertation, "Hochauflösende Winkelschätzung für automobile Radarsysteme (High-resolution angle estimation for automobile radar systems)," 2010).

Application of the calibration by the central control apparatus advantageously allows costs in radar sensor head 100 to be reduced, since less computation performance is required therein, and less power dissipation also occurs at an unfavorable location (e.g., due to the installation location of radar sensor 100 in the vehicle); computation performance is advantageously outsourced to central control apparatus 120, where computation performance scales considerably better by comparison with cost. This makes possible the execution, in the central control apparatus, of calculation algorithms that require considerably more computation performance than might be available in an individual sensor.

Radar sensor head 100 furthermore has a connection 80 to a broadband data lead (not depicted) over which data are transferred to the central control apparatus (not depicted).

Figure 2:
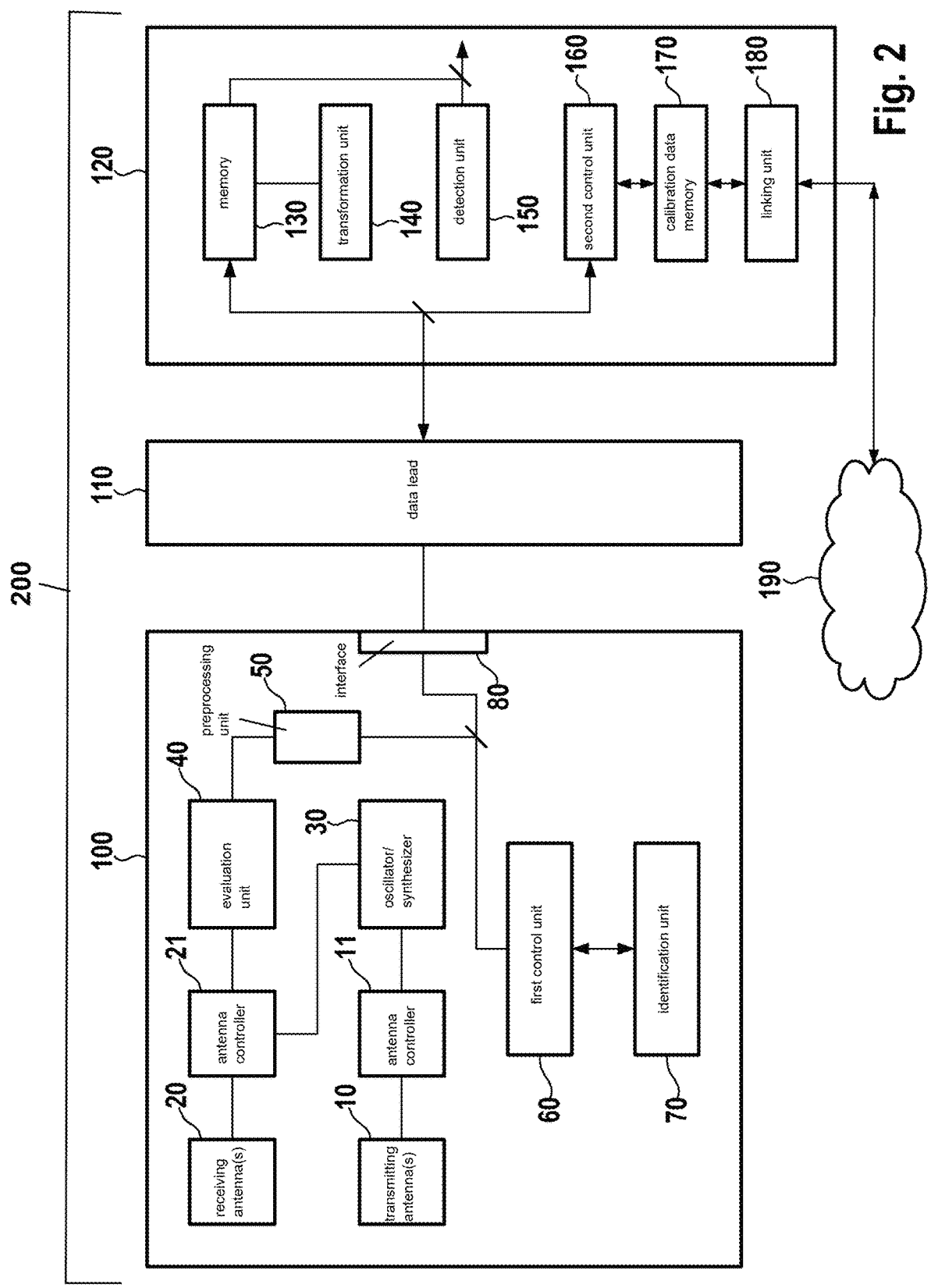
FIG. 2 schematically depicts a radar system having an embodiment of an example radar sensor head in accordance with the present invention.

FIG. 2 is a schematic block diagram of a radar system 200, implemented using the proposed radar sensor head 100, for a vehicle. Provision is made that the transformed digital measured data from radar sensor head 100 are transferred via a broadband data lead 110 to a central control apparatus 120. A time stamp is associated with the transferred digital measured data by way of first control unit 60 disposed in radar sensor head, 100, and is likewise transferred to central control apparatus 120. After signal processing has taken place in central control apparatus 120, the calibration data must be present there, the calibration data being used by a detection unit 150 of central control apparatus 120.

Central control apparatus 120 can receive and further process the transferred digital measured data, for example using a memory 130, a transformation unit 140 for carrying out a Doppler FFT, detection unit 150, and a second control unit 160 that functionally interacts with first control unit 60 of radar sensor head 100. Thanks to the time stamp transferred along with the measured data, the latter can be precisely classified as to time.

Central control apparatus 120 has at least one processor for processing received data, and at least one memory 130 for at least temporary storage of data. As a result, central control apparatus 120 can at least temporarily store the measured data of radar sensor head 100 transferred by data lead 110, and can process, forward, or output them as required by the respective application. Central control apparatus 120 can be replaced as necessary by a higher-performance control unit. Since microprocessors are preferably used in central control apparatus 120, sophisticated algorithms for processing the measured data can be used, and more accurate calculation results (for instance, angle estimates) can be obtained.

Once downloading has occurred, the calibration data are stored in a calibration data memory 170. Downloading occurs via a linking unit 180 by way of which a link is created to a server 190 from which the calibration data are downloaded into calibration data memory 170. Radar system 200 can be embodied, for example, as a chirp sequence radar, but can also be operated with other types of modulation. Alternative radar methods can be, for example, slow FMCW radars having no subsequent Doppler FFT, pseudo-noise (PN) radars having an analysis unit as a correlator bank, or an OFDM radar having an analysis unit for carrying out a spectral division.

In radar system 200, the at least one time datum can be generated by a first control unit 60 disposed in radar sensor head 100. First control unit 60 can receive control instructions, transferred, e.g., via data lead 110, and execute them, and can equip the digitized measured data with precise time information. First control unit 60 can furthermore be used to control radar sensor head 100 and, for example, for monitoring control or cycle control. In order for time synchronization to be able to take place in radar system 200, time stamps for each transferred chirp or cycle must be added by first control unit 60, for example, to the transferred measured data so that central control apparatus 120 can effectively use the measured data transferred from radar sensor head 100.

Oscillator 30 of radar sensor head 100 can be adjusted by second control unit 160 of central control apparatus 120. The advantageous result of implementing first control unit 60, which functionally interacts with second control unit 160, in radar sensor head 100 is that control of the components of radar sensor head 100 can be implemented by central control apparatus 120. The oscillator(s) of radar sensor head 100 can thus also be directly or indirectly controlled or regulated.

Oscillators of a radar system 200 having at least two radar sensor heads 100 (not depicted) can be synchronized with one another by central control apparatus 120. Several radar sensor heads 100 spaced apart from one another can be installed in a vehicle and can be data-conveyingly connected to one or several central control apparatuses 120 via data connections. Because control units 60 are implemented in the various radar sensor heads 100, the respective oscillators of transmitting antennas 10 can be synchronized with one another when multiple radar sensor heads 100 are utilized. The accuracy of the measurement results can thereby advantageously be increased. Driver assistance functions or automated driving functions of the vehicle can thereby be optimized. The number of radar sensor heads 100 used can furthermore be increased as desired, with no negative influence on performance.

It is also possible for several (for instance, three) radar sensor heads 100 to be connected (not depicted) via corresponding data leads 110 to one central control apparatus 120. Central control apparatus 120 outputs control instructions via data leads 110 to control units 60 of the respective radar sensor heads 100, with the result that the different radar sensor heads 100, and in particular the respective oscillators 30, are optimally coordinated and synchronized with one another.

An embodiment of the radar sensor head which is not depicted in the Figures provides for the head to be disposed, together with the central control apparatus, in an "all-in-one" sensor, identification of the all-in-one sensor, and associated downloading of calibration data, being achievable on the all-in-one sensor.

Figure 3:
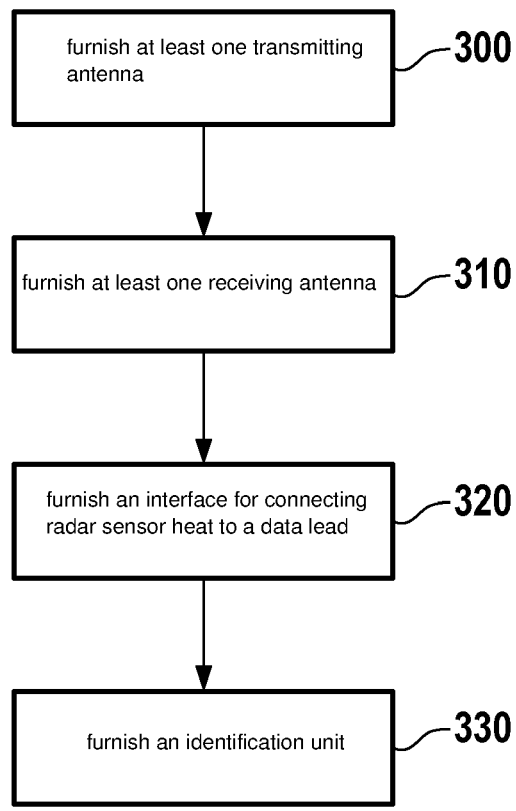
FIG. 3 schematically depicts a method for manufacturing a radar sensor head in accordance with an example embodiment of the present invention.

FIG. 3 schematically shows the execution of an example method for manufacturing a radar sensor head 100 for a radar system 200.

In a step 300, at least one transmitting antenna 10 for generating radar waves is furnished.

In a step 310, at least one receiving antenna 20 for receiving radar waves is furnished.

In a step 320, an interface 80 for connecting radar sensor head 100 to a data lead 110 is furnished.

In a step 330, an identification unit 70 for identifying the radar sensor head is furnished, a downloading of calibration data of the sensor head to a central control apparatus being initiatable by way of the identification unit.

The sequence of the aforesaid steps can be also suitably interchanged.

What is claimed is:

1. A radar sensor head for a radar system, comprising:
   at least one transmitting antenna for generating radar waves, and at least one receiving antenna for receiving radar waves;
   an interface configured to connect the radar sensor head to a data lead; and
   an identification unit configured to identify the radar sensor head, the identification unit configured to initiate a downloading of calibration data of the radar sensor head to a central control apparatus.

2. The radar sensor head as recited in claim 1, further comprising:
   a preprocessing unit configured for defined preprocessing of received data.

3. The radar sensor head as recited in claim 1, wherein the calibration data are updatable using the identification unit.

4. The radar sensor head as recited in claim 1, wherein the downloading of the calibration data is executable in wireless or wire-based fashion.

5. The radar sensor head as recited in claim 1, wherein in conjunction with the downloading of the calibration data, an enabling of the radar sensor head is executable.

6. The radar sensor head as recited in claim 1, wherein a sensor ID is transferrable using the identification unit.

7. The radar sensor head as recited in claim 6, wherein the sensor ID is transferrable in encrypted or signed fashion using the identification unit.

8. The radar sensor head as recited in claim 6, wherein a public key of an encryption method is transferrable as the sensor ID.

9. The radar sensor head as recited in claim 1, wherein the calibration data are at least one of the following: (i) typical noise level, (ii) antenna properties, (iii) amplitude/phase deviations, (iv) position of antenna elements, (v) temperature properties, (vi) temperature profile.

10. The radar sensor head as recited in claim 1, wherein the radar waves received by the at least one receiving antenna are converted by an analog/digital converter into digital measured data, and are labeled with at least one time datum.

11. A radar system, comprising:
   at least one radar sensor head including at least one transmitting antenna for generating radar waves, and at least one receiving antenna for receiving radar waves, an interface configured to connect the radar sensor head to a data lead, and an identification unit configured to identify the radar sensor head, the identification unit configured to initiate a downloading of calibration data of the radar sensor head to a central control apparatus;
   the central control apparatus being configured to transmitting data and process received data, the central control apparatus having a linking unit to a server for downloading calibration data; and
   the data lead being between the central control apparatus and the at least one radar sensor head.

12. The radar system as recited in claim 11, wherein the central control apparatus has at least one calibration data memory.

13. A method for manufacturing a radar sensor head, comprising the following steps:
   furnishing at least one transmitting antenna for generating radar waves, and at least one receiving antenna for receiving, radar waves;
   furnishing an interface configured to connect the radar sensor head to a data lead; and
   furnishing an identification device configured to identify the radar sensor head, a downloading of calibration data of the radar sensor head to a central control apparatus being initiable using the identification device.

* * * * *